(12) United States Patent
Gibbs et al.

(10) Patent No.: US 6,507,462 B1
(45) Date of Patent: Jan. 14, 2003

(54) DISC DRIVE VOICE COIL MOTOR WITH SHROUD FEATURE

(75) Inventors: Robert Mitchell Gibbs, Longmont, CO (US); Aaron Steve Macpherson, Fort Collins, CO (US)

(73) Assignee: Seagate Technology LLC, Scotts Valley, CA (US)

(*) Notice: Subject to any disclaimer, the term of this patent is extended or adjusted under 35 U.S.C. 154(b) by 121 days.

(21) Appl. No.: 09/689,471

(22) Filed: Oct. 12, 2000

Related U.S. Application Data
(60) Provisional application No. 60/158,829, filed on Oct. 12, 1999.

(51) Int. Cl.$^7$ ................................. G11B 21/08
(52) U.S. Cl. ................................................. 360/264.7
(58) Field of Search .................... 360/264.7, 97.02, 360/97.03, 105, 269, 98, 133, 106; 369/269, 291, 75.1, 215, 222; 206/444, 309, 261; G11B 33/14

(56) References Cited

U.S. PATENT DOCUMENTS

| | | | |
|---|---|---|---|
| 4,583,213 A | 4/1986 | Bracken et al. | 369/261 |
| 4,881,139 A * | 11/1989 | Hazebrouck | 360/97.01 |
| 5,025,335 A * | 6/1991 | Stefansky | 360/97.01 |
| 5,243,495 A * | 9/1993 | Read et al. | 360/97.01 |
| 5,517,372 A | 5/1996 | Shibuya et al. | 360/97.02 |
| 5,566,375 A * | 10/1996 | Isomura | 360/264.9 |
| 5,579,189 A * | 11/1996 | Morehouse et al. | 360/256.4 |
| 5,631,787 A | 5/1997 | Huang et al. | 360/97.02 |
| 5,696,649 A | 12/1997 | Boutaghou | 360/97.03 |
| 5,898,545 A | 4/1999 | Schirle | 360/105 |
| 5,905,609 A * | 5/1999 | Butler et al. | 360/264.8 |
| 5,907,453 A | 5/1999 | Wood et al. | 360/97.02 |
| 5,909,338 A * | 6/1999 | Butler et al. | 360/264.2 |
| 5,956,203 A * | 9/1999 | Schirle et al. | 360/97.03 |
| 6,208,484 B1 * | 3/2001 | Voights | 360/97.02 |
| 6,369,978 B1 * | 4/2002 | Shimizu et al. | 360/97.03 |

FOREIGN PATENT DOCUMENTS

JP 07-320478 * 12/1995 .......... G11B/33/14

* cited by examiner

Primary Examiner—William Korzuch
Assistant Examiner—Christopher R Beacham
(74) Attorney, Agent, or Firm—Merchant & Gould P.C.

(57) ABSTRACT

A disc drive having a base plate and an information storage disc supported for rotation by a drive motor on the base plate. The disc drive further includes a rotary actuator assembly mounted on the base plate adjacent the information storage disc. The actuator assembly has an actuator arm carrying a transducer at a distal end thereof and a voice coil motor operably attached to the actuator arm for movement of the transducer over the disc. The voice coil motor has a vertically extending shroud flange positioned adjacent the outer peripheral edge of the disc, whereby the shroud flange directs air-flow along the peripheral edge of the disc during drive operation.

6 Claims, 3 Drawing Sheets

DISC DRIVE VOICE COIL MOTOR WITH SHROUD FEATURE

RELATED APPLICATIONS

This application claims the priority of U.S. Provisional Patent Application Serial No. 60/158,829 entitled "DISC DRIVE VOICE COIL MAGNET WITH SHROUD FEATURE" filed Oct. 12, 1999.

FIELD OF THE INVENTION

This application relates to magnetic disc drives and more particularly to an improved voice coil motor (VCM) assembly including a shroud feature.

BACKGROUND OF THE INVENTION

Disc drives are data storage devices that store digital data in magnetic form on a storage medium on a rotating information storage disc. Modern disc drives include one or more rigid discs that are coated with a magnetizable medium and mounted on the hub of a spindle motor for rotation at a constant high speed. Information is stored on the discs in a plurality of concentric circular tracks typically by an array of transducers ("heads") mounted to a radial actuator for movement of the heads relative to the discs. Each of the concentric tracks is generally divided into a plurality of separately addressable data sectors. The read/write transducer, e.g., a magneto resistive read/write head, is used to transfer data between a desired track and an external environment. During a write operation, data is written onto the disc track and during a read operation the head senses the data previously written on the disc track and transfers the information to the external environment. Critical to both of these operations is the accurate locating of the head over the center of the desired track.

The heads are mounted via flexures at the ends of a plurality of actuator arms that project radially outward from the actuator body. The actuator body pivots about a shaft mounted to the disc drive housing at a position closely adjacent the outer extreme of the discs. The pivot shaft is parallel with the axis of rotation of the spindle motor and the discs, so that the heads move in a plane parallel with the surfaces of the discs. The radial position of the heads is controlled through the use of a voice coil motor (VCM) assembly positioned adjacent to the disc.

The rotation of the disc at high speeds during operation creates airflow adjacent the disc surfaces. When a large volume of air space is adjacent the rotating disc, this airflow is often turbulent. It is preferable that turbulence in the airflow minimized. Turbulence can effect the radial and vertical positioning of the head over the center of the desired track, and can cause the disc to flutter undesirably.

To reduce the amount of turbulent airflow during operation of the disc, often an inner disc shroud is constructed in the base plate of the disc drive and by structural features to define a minimal disc operation space. The shroud surrounds the disc such that the inner surface of the shroud is in close proximity to the outer peripheral surface of the disc around its circumference to reduce turbulence. It is preferable that the disc shroud enclose as much of the circumference of the outer peripheral surface of the disc as possible, without interfering with other components of the disc drive. However, openings in such a disc shroud are typically provided adjacent the actuator assembly to accommodate the voice coil motor (VCM), accommodate movement of the actuator and allow for proper installation and operational clearances for these components. These openings in the shroud, however, permit turbulence to develop when the disc is rotated.

SUMMARY OF THE INVENTION

Against this backdrop the present invention has been developed. The present invention is an apparatus incorporating an airflow shroud feature in a VCM assembly. More particularly, the top pole piece of the VCM incorporates a disc shroud extension feature that is designed to help alleviate turbulence in the disc drive.

In accordance with one preferred embodiment, the invention is implemented as a disc drive having a base plate and an information storage disc supported for rotation by a drive motor on the base plate. The disc drive further includes a rotary actuator assembly mounted on the base plate adjacent the information storage disc. The actuator assembly has an actuator arm carrying a transducer at a distal end thereof and a voice coil motor operably attached to the actuator arm for movement of the transducer over the disc. The voice coil motor has a vertically extending shroud flange positioned adjacent the outer peripheral edge of the disc, whereby the shroud flange directs air-flow along the peripheral edge of the disc during drive operation.

The invention can be implemented in accordance with another preferred embodiment as a voice coil motor assembly for use in a disc drive. The voice coil motor assembly includes a top plate pole piece and a bottom plate pole piece connected together in spaced relation forming a gap, and a voice coil in the gap connected to the actuator. The VCM assembly further includes a pair of magnets in side by side relation on one of the pole pieces in the gap that establish a magnetic field in which the coil is immersed. A vertically projecting shroud flange extends from one of the top plate or the bottom plate toward the other plate adjacent the outer peripheral surface of the disc whereby the shroud directs airflow along the outer peripheral surface of the disc when the disc is operated.

Other features as well as advantages which characterize various embodiments of the present invention will be apparent from a reading of the following detailed description and a review of the associated drawings.

DETAILED DESCRIPTION

Figure 1:
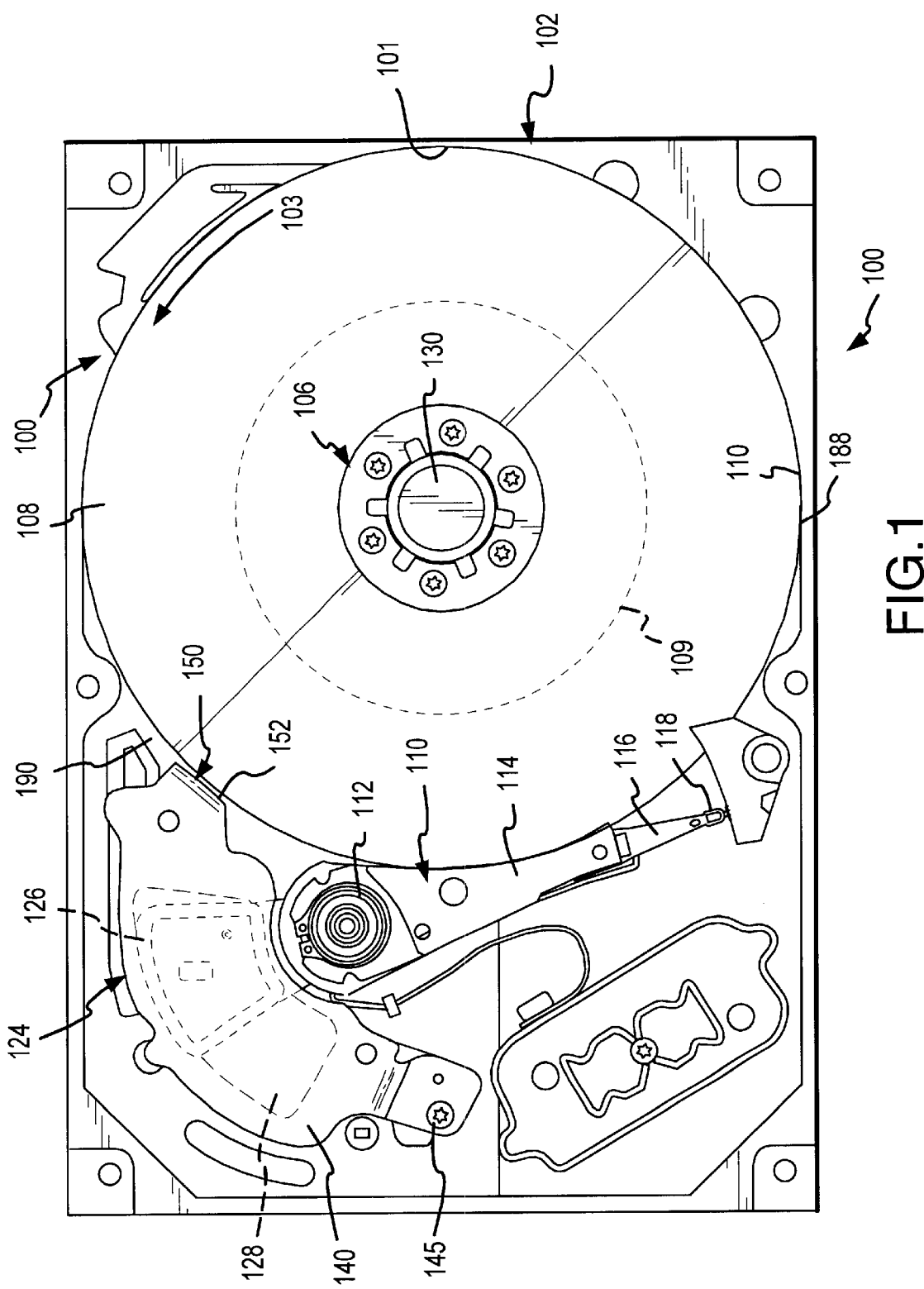
FIG. 1 is a top plan view of a disc drive, with its top cover removed, incorporating a disc clamping assembly in accordance with a preferred embodiment of the present invention.

A disc drive 100 constructed in accordance with a preferred embodiment of the present invention is shown in FIG. 1. The disc drive 100 includes a base plate 102 to which various components of the disc drive 100 are mounted. The base plate 102 defines an inner disc shroud 101 that defines an inner disc space in which the disc operates. A top cover (not shown) cooperates with the base 102 to form an internal, sealed environment for the internal components of the disc drive 100 in a conventional manner. The components include a disc drive motor 106 that rotates one or more information storage discs 108 within the disc shroud 101 at a constant high speed.

In operation, as the disc 108 spins, frictional forces impart a velocity to the boundary layer air surrounding the disc 108. This velocity propagates throughout the volume of air within the disc space, inducing a general positive profile airflow from the rotating disc in the direction of rotation of the disc 108, shown by directional arrow 103. To reduce turbulence and provide a more uniform air flow, preferably the inner disc shroud 101 is constructed such that the inner surface of the shroud 101 is in close proximity to the outer peripheral surface 188 of the disc 108, and encloses as much of the circumference of the outer peripheral surface 188 of the disc 108 as possible, without interfering with other internal components of the disc drive 100.

Information is written to and read from recorded data arranged in tracks 109 on the discs 108 through the use of read/write transducers or heads 118 carried by an actuator assembly 110 which rotates about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a head 118 that includes an air bearing slider (not shown) enabling the head 118 to fly in close proximity above the corresponding surface of the associated information storage disc 108 as a result of the airflow created by the spinning of the disc 108. The flying height of the heads 118 is preferably maintained as close to the disc 108 surface as possible. The flying height must be high enough so that turbulent air flow variations and shock events will not permit the heads to touch the surface. Therefore, less turbulent airflow is desirable for the accurate flying of the head 118.

The radial position of the heads 118 is controlled through the use of a voice coil motor (VCM) assembly 124, which typically includes a coil 126 attached to the actuator assembly 110, as well as one or more permanent magnets 128 that establish a magnetic field in which the coil 126 is immersed. The controlled application of current to the coil 126 causes magnetic interaction between the permanent magnets 128 and the coil 126 so that the coil 126 moves in accordance with the well-known Lorentz relationship. As the coil 126 moves, the actuator assembly 110 pivots about the bearing shaft assembly 112 and the heads 118 are caused to move across the surfaces of the discs 108.

Figure 2:
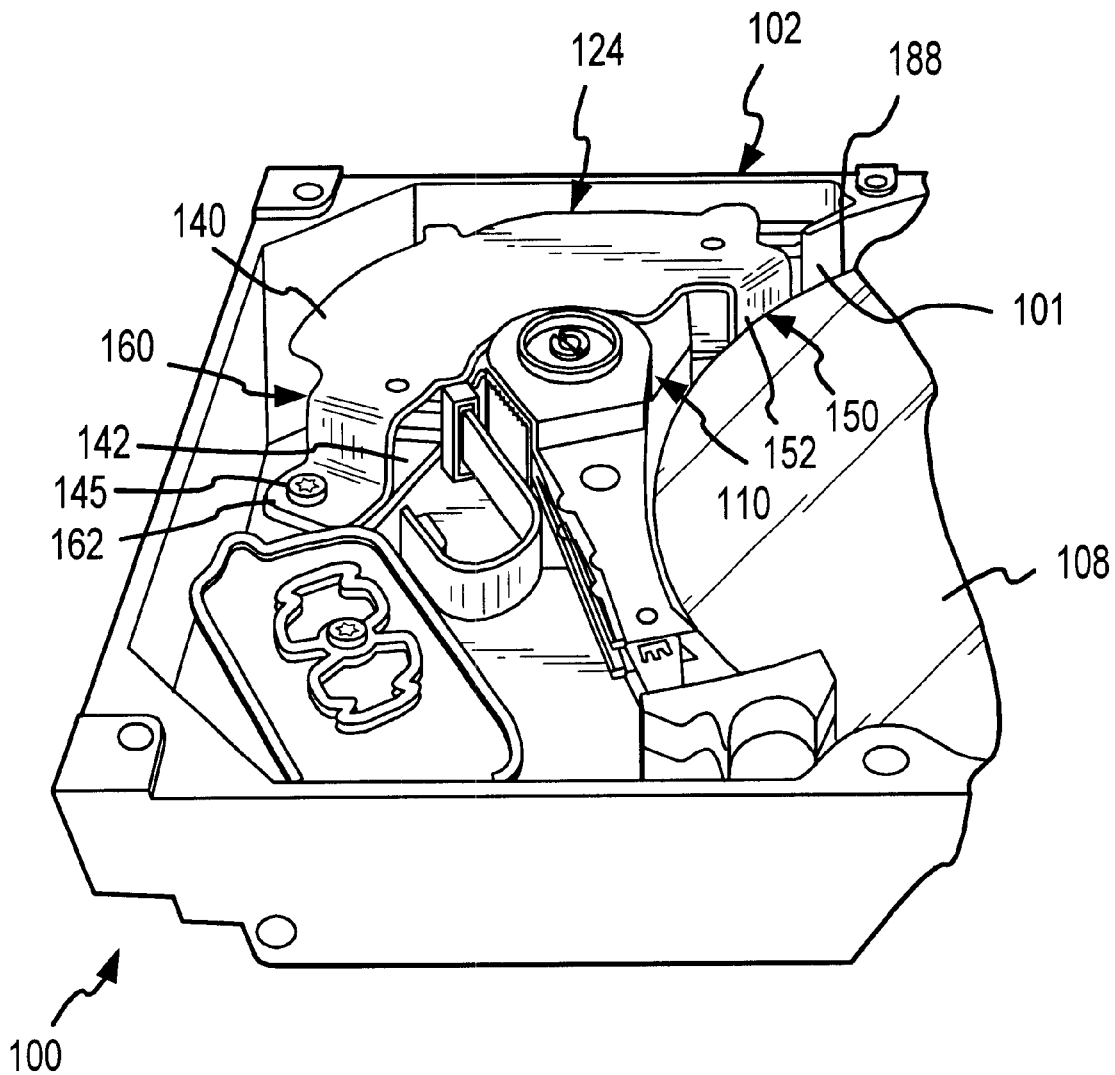
FIG. 2 is an enlarged partial perspective view of the disc drive shown in FIG. 1.
Figure 3:
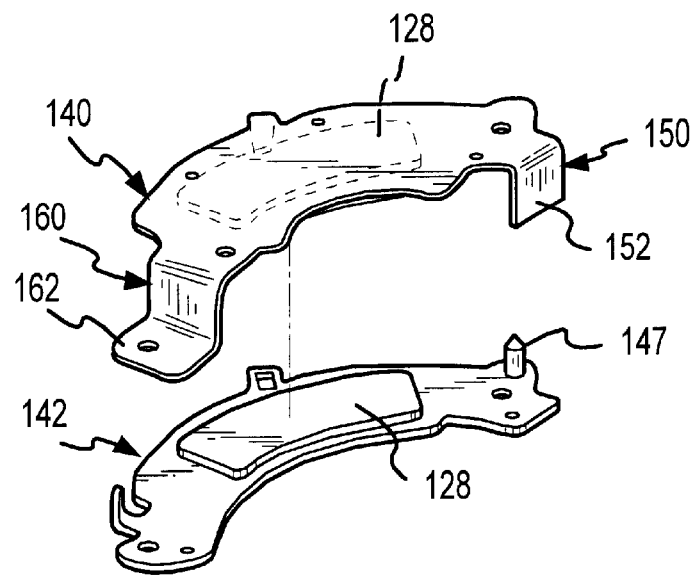
FIG. 3 is an exploded perspective view of the top and bottom VCM pole piece plates in the disc drive shown in FIGS. 1 and 2.

Referring to FIGS. 2 and 3, the VCM assembly 124 also includes a horizontally extending stationary structural top pole piece plate 140 and a stationary structural bottom pole piece plate 142 that are connected to one another and to the base plate 102 and house the coil 126 and magnets 128. Typically, a bipolar magnet 128 is mounted on the bottom surface of the top plate 140 over the coil 126, and another bipolar magnets 128 is mounted on the upper surface of the bottom plate 142 beneath the coil 126. However, two or more magnets may be used on each surface. The top and bottom plates 140 and 142 provide magnetic return paths for magnetic flux utilized in operation of the VCM.

Referring back to FIGS. 1 and 2, the VCM assembly 124 is located on the base plate 102 adjacent to the disc 108. Due to the close proximity of the VCM assembly 124 to the disc 108, an opening 190 in the disc shroud 101 is formed. Typically, such an opening 190 in the disc shroud 101 adjacent to the VCM assembly 124 permits proper installation and operation of the VCM assembly 124 and actuator assembly 110 over the disc 108. However, as discussed above, such an opening 190 in the disc shroud 101 can be undesirable because it permits the creation of turbulent airflow when the disc 108 is operated.

Therefore, the top plate 140 of the VCM assembly 124 includes a vertically projecting shroud portion or shroud tab 150 that is positioned adjacent to the disc 108. The tab 150 extends between the top plate 140 and the bottom plate 142 in close proximity to the outer peripheral surface 188 of the disc 108, and fills at least a portion of the opening 190. The tab 150 has an outer shroud surface 152 facing, and in close proximity to, the outer peripheral surface 188 of the disc 108. Preferably, the outer surface 152 of the tab 150 is generally horizontally arcuate in shape corresponding to the outer radius of the disc 108 such that it can be positioned in close proximity to the outer peripheral surface 188 of the disc 108. The tab 150 on the top plate 140 of the VCM assembly 124 acts as an additional shroud feature to direct airflow along the periphery of the disc space, and thus reduce the amount of turbulence in the airflow. Generally, the closer the outer surface 152 is to the outer peripheral surface 188 of the disc 108, the greater retention of laminar airflow, and the greater the reduction in turbulence. Additionally, as the amount of the opening 190 that is filled by the tab 150 increases, the retention of airflow and reduction in turbulence generally increase as well.

In the embodiment shown, the tab 150 is an integral portion of the top plate 142, and it extends downwardly toward the bottom plate 142 adjacent the outer surface 188 of the disc 108. Those of skill in the art, and others, will recognize that in other embodiments, the tab 150 can be a separate piece fastened to the top plate 140 or bottom plate 142 or can be an upwardly extending tab portion of the bottom plate 142 that extends upwardly toward the top plate 142 adjacent the outer surface 188 of the disc 108. Preferably, the tab 150 is an integral portion of the top plate 140, and is bent, cast, machined, molded or otherwise integrally formed with the rest of the top plate 140. Such an integrally formed flange 150 is advantageous during assembly and disassembly of the VCM in that fewer components are necessary.

More particularly, the tab 150 may be formed in either of top plate 140 or bottom plate 142. Plates 140 and 142 are flat, metal plates that form magnetically permeable top and bottom pole pieces of the voice coil motor. The plates are spread apart to form a horizon gap therebetween in which the coil 126 fastened to the actuator arm 114 in free to rotate on the bearing assembly 112. The permanent magnets 128 are fastened, with opposing polarity forces facing each other, to the top plate 140 and/or bottom plate 142. As shown in FIG. 2, one end 160 of the top plate 140 is bent vertically downward and then outward to form a horizontal flange 162 which is fastened to bottom plate 142 and to base plate 102 with screws 145. The other end of the top plate 140 is spaced from the bottom plate 142 by a magnetically permeable standoff.

Figure 4:
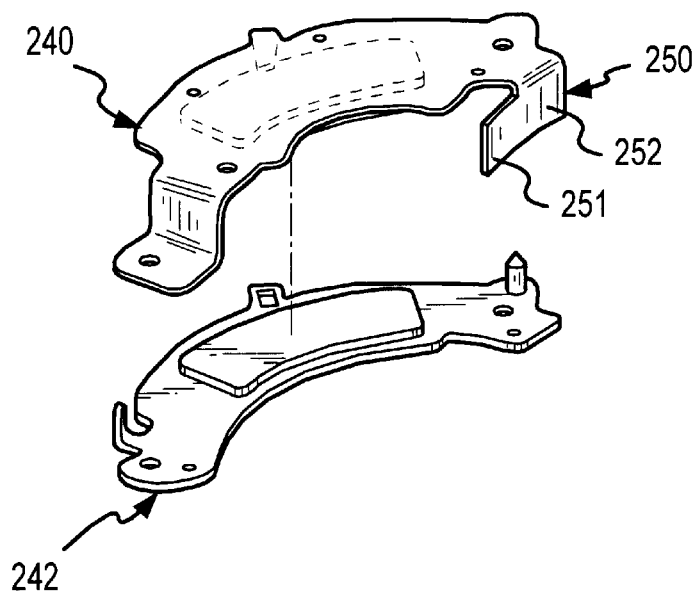
FIG. 4 is an exploded perspective view of alternative top and bottom VCM pole piece plates in accordance with another embodiment of the present invention.

FIG. 4 shows a partial exploded perspective view of another embodiment of VCM plates in accordance with the present invention. Top plate 240 and bottom plate 242 are generally the same as those shown in FIGS. 1–3 and discussed above, with one difference—the flange 250 includes an additional flag portion 251. The additional flag portion 251 increases the side of the outer surface 252 that is facing, and in close proximity to, the outer peripheral surface 188 of the disc 108. As such, the amount of the opening 190 that is filled by the flange 250 increases due to the addition of the flag portion 251. Preferably, the flag portion 251 is integrally formed with the remainder of the flange 250.

In summary, the present invention may be viewed as a disc drive (such as 100) including a base plate (such as 102), an information storage disc (such as 108) supported for rotation by a drive motor (such as 106) on the base plate, and a rotary actuator assembly (such as 110) mounted on the base plate adjacent the information storage disc. The actuator assembly (such as 110) has an actuator arm (such as 114) carrying a transducer (such as 118) at a distal end thereof and a voice coil motor (such as 124) operably attached to the actuator arm for movement of the transducer over the disc. The voice coil motor has a vertically extending shroud flange (such as 150 or 250) positioned adjacent the outer peripheral edge (such as 188) of the disc, whereby the shroud flange directs air-flow along the peripheral edge of the disc during drive operation. In some embodiments, the voice coil motor (such as 124) includes a top pole plate (such as 140) and a bottom pole plate (such as 142), and the shroud flange (such as 150 or 250) is connected to one of the pole plates. In some embodiments, the shroud flange (such as 150 or 250) is rigidly connected to the top plate (such as 140). The shroud flange (such as 150) can be integral with the top plate (such as 140). The shroud flange can be a tab (such as 150 or 250) downwardly extending from one end of the top pole plate (such as 140). In some embodiments, an outer surface of the shroud flange (such as 150 or 250) is generally arcuate in shape complementary to the outer peripheral surface (such as 188) of the disc (such as 108). In yet additional embodiments, the shroud flange (such as 150 or 250) has an extension portion (such as 251) extending in the direction of drive rotation from the top plate (such as 140).

The present invention may also be summarized when viewed as a voice coil motor assembly (such as 124) for use in a disc drive (such as 100) having a disc (such as 108) supported for rotation by a drive motor (such as 106) and an actuator (such as 110) for moving a transducer (such as 118) over the disc, the disc including an outer peripheral surface (such as 188). The voice coil motor assembly (such as 124) includes a top plate pole piece (such as 140) and a bottom plate pole piece (such as 142) connected together in spaced relation forming a gap. A voice coil (such as 126) is in the gap and connected to the actuator (such as 110). A magnet (such as 128) is on one of the pole pieces (such as 140 or 142) in the gap that establishes a magnetic field in which the coil (such as 126) is immersed. A vertically projecting shroud flange (such as 150 or 250) extends from one of the top plate (such as 140) or the bottom plate (such as 142) toward the other plate adjacent the outer peripheral surface (such as 188) of the disc (such as 108) whereby the shroud (such as 150 or 250) directs airflow along the outer peripheral surface of the disc when the disc is operated. In some embodiments, the shroud flange (such as 150 or 250) is rigidly connected to the top plate (such as 140). In some embodiments, the shroud flange (such as 150 or 250) is integral with the top plate (such as 140). The shroud flange (such as 150 or 250) can include a shroud surface (such as 152) facing the outer peripheral surface (such as 188) of the disc (such as 108). In some embodiments, the shroud surface (such as 152) of the shroud flange (such as 150 or 250) is generally arcuate in shape complementary to the outer peripheral edge of the disc (such as 108). The shroud flange (such as 150 or 250) can include an extension portion (such as 251) extending in the direction of drive rotation from the top plate (such as 140).

It will be clear that the present invention is well adapted to attain the ends and advantages mentioned as well as those inherent therein. While presently preferred embodiments have been described for purposes of this disclosure, numerous changes may be made which will readily suggest them to those skilled in the art. For example, although the embodiments described above involve a single information storage disc, those of skill in the art, and others, will understand that the assemblies of the invention can be used in drives having a multiple disc stack. Additionally, as discussed briefly above, the flange of the shroud feature on the VCM can be mounted on the bottom VCM plate rather than the top VCM plate.

Many other such modifications, changes and alternatives are also contemplated, and will be apparent to those of skill in the art. Accordingly, all such modifications, changes and alternatives are encompassed in the spirit of the invention disclosed and as defined in the appended claims.

What is claimed is:

1. A disc drive comprising:

a base plate;

an information storage disc supported for rotation by a drive motor on the base plate; and a rotary actuator assembly mounted on the base plate adjacent the information storage disc, the actuator assembly having an actuator arm carrying a transducer at a distal end thereof and a voice coil motor operably attached to the actuator arm for movement of the transducer over the disc, the voice coil motor having a sheet metal top pole piece and a sheet metal bottom pole piece spaced from the top pole piece wherein an end portion of one of the pole pieces forms a curved, vertically extending shroud flange extending toward the other pole piece adjacent and in close proximity to an outer peripheral edge of the disc and having a shape complementary to the outer peripheral edge of the disc directing air-flow along the peripheral edge of the disc during drive operation.

2. The disc drive assembly of claim 1, wherein the shroud flange is a portion of the top pole piece.

3. The disc drive according to claim 2 wherein the shroud flange has an extension portion extending in the direction of drive rotation beyond the top pole piece.

4. A voice coil motor assembly for use in a disc drive having a disc supported for rotation by a drive motor and an actuator for moving a transducer over the disc, the disc including a circular outer peripheral edge, the voice coil motor assembly comprising:

a top plate pole piece and a bottom plate pole piece connected together in spaced relation forming a gap;

a voice coil in the gap connected to the actuator;

a magnet on one of the pole pieces in the gap that establishes a magnetic field in which the coil is immersed; and a portion of one of the pole pieces, spaced from the magnet, forming a vertically projecting curved shroud flange extending from the one of the pole pieces toward the other pole piece adjacent and in close proximity to the outer peripheral edge of the disc directing airflow along the outer peripheral edge of the disc when the disc rotates.

5. The voice coil motor assembly of claim 4 wherein the shroud flange is a portion of the top plate pole piece.

6. The voice coil motor assembly of claim 4 wherein the shroud flange has an extension portion extending from the vertically projecting shroud flange in the direction of drive rotation.

* * * * *